United States Patent
Rao et al.

(10) Patent No.: US 8,423,520 B2
(45) Date of Patent: Apr. 16, 2013

(54) METHODS AND APPARATUS FOR EFFICIENT COMPRESSION AND DEDUPLICATION

(75) Inventors: Goutham Rao, San Jose, CA (US); Murali Bashyam, Fremont, CA (US); Vinod Jayaraman, San Francisco, CA (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 12/624,354

(22) Filed: Nov. 23, 2009

(65) Prior Publication Data
US 2011/0125722 A1    May 26, 2011

(51) Int. Cl.
*G06F 17/30* (2006.01)

(52) U.S. Cl.
USPC .............. 707/693; 707/692; 707/999.101

(58) Field of Classification Search ............ None
See application file for complete search history.

(56) References Cited

U.S. PATENT DOCUMENTS

| 2008/0050047 | A1* | 2/2008 | Bashyam et al. | 382/305 |
| 2010/0082547 | A1* | 4/2010 | Mace et al. | 707/648 |

* cited by examiner

*Primary Examiner* — Anteneh Girma
(74) *Attorney, Agent, or Firm* — Kwan & Olynick LLP

(57) ABSTRACT

Mechanisms are provided for performing efficient compression and deduplication of data segments. Compression algorithms are learning algorithms that perform better when data segments are large. Deduplication algorithms, however, perform better when data segments are small, as more duplicate small segments are likely to exist. As an optimizer is processing and storing data segments, the optimizer applies the same compression context to compress multiple individual deduplicated data segments as though they are one segment. By compressing deduplicated data segments together within the same context, data reduction can be improved for both deduplication and compression. Mechanisms are applied to compensate for possible performance degradation.

18 Claims, 9 Drawing Sheets

| Data A | Data B | Data C | File X 101 |
|--------|--------|--------|------------|
| Data D | Data B | Data C | File Y 103 |
| Data D | Data B | Data E | File Z 105 |

| Filemap File X 201 | | |
|---|---|---|
| Offset 203 | Index 205 | Lname 207 |
| 0K | 0.1 | NULL |
| 8K | 0.2 | NULL |
| 16K | 0.3 | NULL |

Figure 2B

| Datastore Suitcase 271 | | |
|---|---|---|
| Data Table 251 | | |
| Index 253 | Data Offset 255 | Data Reference Count 257 |
| 1 | Offset-Data A | 1 |
| 2 | Offset-Data B | 1 |
| 3 | Offset-Data C | 1 |
| Datastore | | |
| | Data 261 | Last File 263 |
| 1 | Data A | File X 201 |
| 2 | Data B | File X 201 |
| 3 | Data C | File X 201 |

Figure 3

| Dictionary 301 ||
|---|---|
| Hash | Storage Location 321 |
| a | Location 323 |
| b | Location 325 |
| c | Location 327 |

| Dictionary 351 ||
|---|---|
| Hash | Storage Location 371 |
| i | Location 373 |
| j | Location 375 |
| k | Location 377 |

METHODS AND APPARATUS FOR EFFICIENT COMPRESSION AND DEDUPLICATION

TECHNICAL FIELD

The present disclosure relates to efficient deduplication and compression. More specifically, the present disclosure relates to effectively and efficiently performing both deduplication and compression on data segments.

DESCRIPTION OF RELATED ART

Maintaining vast amounts of data is resource intensive not just in terms of the physical hardware costs but also in terms of system administration and infrastructure costs. Some mechanisms provide compression of data to save resources. For example, some file formats such as the Portable Document Format (PDF) are compressed. Some other utilities allow compression on an individual file level in a relatively inefficient manner.

Data deduplication refers to the ability of a system to eliminate data duplication across files to increase storage, transmission, and/or processing efficiency. A storage system which incorporates deduplication technology involves storing a single instance of a data segment that is common across multiple files. In some examples, data sent to a storage system is segmented in fixed or variable sized segments. Each segment is provided with a segment identifier (ID), such as a digital signature or the actual data. Once the segment ID is generated, it can be used to determine if the data segment already exists in the system. If the data segment does exist, it need not be stored again. The reference count for the single instance data segment is incremented and some form of file mapping construct is used to associate the deduplicated segment from a particular file to the single instance stored in the storage system.

However, mechanisms for performing deduplication are limited. Consequently, mechanisms are provided for improving the efficiency of deduplication when compression is also used.

BRIEF DESCRIPTION OF THE DRAWINGS

The disclosure may best be understood by reference to the following description taken in conjunction with the accompanying drawings, which illustrate particular embodiments of the present invention.

FIG. 1 illustrates a particular example of files and data segments.

FIG. 2A illustrates a particular example of a filemap.

FIG. 2B illustrates a particular example of a datastore suitcase.

FIG. 3 illustrates a particular example of a deduplication dictionary.

DESCRIPTION OF PARTICULAR EMBODIMENTS

Figure 4A:
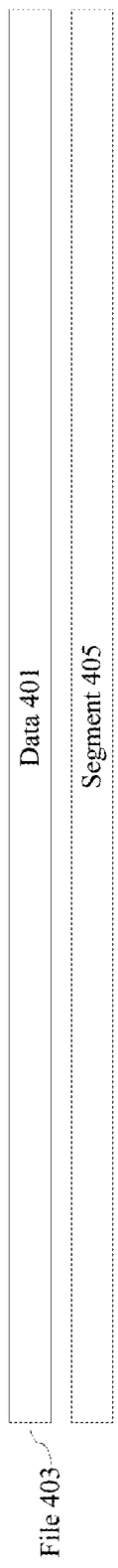
FIG. 4A illustrates a particular example of a file having a single data segment.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques and mechanisms of the present invention will be described in the context of particular compression algorithms. However, it should be noted that the techniques and mechanisms of the present invention apply to a variety of different compression algorithms. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for performing efficient compression and deduplication of data segments. Compression algorithms are learning algorithms that perform better when data segments are large. Deduplication algorithms, however, perform better when data segments are small, as more duplicate small segments are likely to exist. As an optimizer is processing and storing data segments, the optimizer applies the same compression context to compress multiple individual deduplicated data segments as though they are one segment. By compressing deduplicated data segments together within the same context, data reduction can be improved for both deduplication and compression. Mechanisms are applied to compensate for possible performance degradation.

Example Embodiments

Maintaining, managing, transmitting, and/or processing large amounts of data can have significant costs. These costs include not only power and cooling costs but system maintenance, network bandwidth, and hardware costs as well.

Some efforts have been made to reduce the footprint of data maintained by file servers and reduce the associated network traffic. A variety of utilities compress files on an individual basis prior to writing data to file servers. Compression algorithms are well developed and widely available. Some compression algorithms target specific types of data or specific types of files. Compressions algorithms operate in a variety of manners, but many compression algorithms analyze data to determine source sequences in data that can be mapped to shorter code words. In many implementations, the most frequent source sequences or the most frequent long source sequences are replaced with the shortest possible code words. The amount of compression yielded is often represented as a compression ratio.

It is recognized that compression algorithms typically generate that best compression ratios for large data files or large data segments. In large data files and large data segments, compressions algorithms can effectively learn bit patterns and effectively map inefficient bit patterns to shorter code words. Small files and data segments often do not benefit much from compression as the overhead added during compression of a file nullifies any minimal benefit gained from sequence to code word mapping.

By contrast, data deduplication operates most efficiently when data segments are small. In a file server system, deduplication is hidden from users and applications. Data deduplication reduces storage footprints by reducing the amount of redundant data.

Deduplication may involve identifying variable or fixed sized segments. According to various embodiments, each segment of data is processed using a hash algorithm such as MD5 or SHA-1. This process generates a unique ID, hash, or reference for each segment. That is, if only a few bytes of a document or presentation are changed, only changed portions are saved. In some instances, a deduplication system searches for matching sequences using a fixed or sliding window and uses references to identify matching sequences instead of storing the matching sequences again.

According to various embodiments, it can be extremely difficult to determine segment sizes that are efficient for both compression and deduplication. In particular embodiments, if segment sizes are too small, segment compression becomes inefficient. If segment sizes are too large, duplicates become rare and data is insufficiently optimized. Consequently, the techniques and mechanisms of the present invention provide mechanisms for performing both efficient compression and deduplication.

According to various embodiments, an optimization tool can aggressively compress and deduplicate files based on characteristics of particular files and file types as well as based on characteristics across multiple files. According to various embodiments, any processed file that may be smaller, more efficiently read and transmitted, and/or more effectively stored than a non-processed file is referred to herein as an optimized file. Any individual file or portion of the individual file that is processed to increase the storage efficiency of the file is referred to herein as a compressed file. Any file associated with a group of files that are processed to increase the storage efficiency of the group of files is referred to herein as a deduplicated file. That is, instead of simply optimizing a single file, multiple files can be optimized efficiently. It should be noted that a deduplicated file is not necessarily compressed and a compressed filed is not necessarily deduplicated, but an optimized file can be compressed and/or deduplicated.

Data segment sizes are selected for deduplication based on considerations such as file type, desired deduplication dictionary size, desired reduction ratios, etc. Instead of applying compression to individual files or individual segments, compression is applied across multiple files and multiple segments. According to various embodiments, a maximum allowable data size is set so that combined compression for multiple data segments across potentially multiple files is not excessively large. It is also recognized that since read back performance is negatively impacted by compressing multiple segments as though the multiple segments are a single segment. Instead of decompressing a single segment to perform a read of a deduplicated data segment, a block of segments would have to be decompressed. However, the techniques and mechanisms of the present invention recognize that there are circumstances when using a single compression context makes sense. For example, it is recognized that deduplication and compression using a single compression context can be used efficiently for backup or near-line storage. Backup or near-line implementations have lower read performance requirements than implementations involving primary storage.

In other examples, a deduplication system identifies segments that are more frequently accessed and may elect to perform single segment compression on those segments or no compression at all. Segments that are less frequently accessed may be compressed as part of a large set of segments. Frequency of access may be determined by past activity, file type, reference count, etc.

FIG. 1 illustrates examples of files and data segments. According to various embodiments, file X 101 includes data A, data B, and data C. File Y 103 includes data D, data B, and data C. File Z 105 includes data D, data B, and data E. According to various embodiments, each data segment is 8K in size. The three files include five different segments A, B, C, D, and E. Files X 101, Y 103, and Z 105 can be deduplicated to remove redundancy in storing the different segments. For example, data B need only be stored once instead of three times. Data C and data D need only be stored once instead of twice. To further improve storage efficiency, each data segment is also compressed with segment specific compression contexts. A variety of compression algorithms may be applied to each segment. However, the techniques and mechanisms of the present invention recognize that setting an appropriate segment size that is efficient for both compression and deduplication can be difficult. Very limited mechanisms are available for identifying optimal segment sizes. A segment size that is efficient for deduplication is often inefficient for compression.

FIG. 2A illustrates one example of a filemap and FIG. 2B illustrates a corresponding datastore suitcase created after optimizing a file X. Filemap file X 201 includes offset 203, index 205, and lname 207 fields. According to various embodiments, each segment in the filemap for file X is 8K in size. In particular embodiments, each data segment has an index of format <Datastore Suitcase ID>. <Data Table Index>. For example, 0.1 corresponds to suitcase ID 0 and datatable index 1. while 2.3 corresponds to suitcase ID 2 and database index 3. The segments corresponding to offsets 0K, 8K, and 16K all reside in suitcase ID 0 while the data table indices are 1, 2, and 3. The lname field 207 is NULL in the filemap because each segment has not previously been referenced by any file.

FIG. 2B illustrates one example of a datastore suitcase corresponding to the filemap file X 201. According to various embodiments, datastore suitcase 271 includes an index portion and a data portion. The index section includes indices 253, data offsets 255, and data reference counts 257. The data section includes indices 253, data 261, and last file references 263. According to various embodiments, arranging a data table 251 in this manner allows a system to perform a bulk read of the index portion to obtain offset data to allow parallel reads of large amounts of data in the data section.

According to various embodiments, datastore suitcase 271 includes three offset, reference count pairs which map to the data segments of the filemap file X 201. In the index portion, index 1 corresponding to data in offset-data A has been referenced once. Index 2 corresponding to data in offset-data B has been referenced once. Index 3 corresponding to data in offset-data C has been referenced once. In the data portion, index 1 includes data A and a reference to File X 201 which was last to place a reference on the data A. Index 2 includes data B and a reference to File X 201 which was last to place a reference on the data B. Index 3 includes data C and a reference to File X 201 which was last to place a reference on the data C.

According to various embodiments, the dictionary is a key for the deduplication system. The dictionary is used to identify duplicate data segments and point to the location of the data segment. When numerous small data segments exist in a system, the size of a dictionary can become inefficiently large. Furthermore, when multiple optimizers nodes are working on the same data set they will each create their own dictionary. This approach can lead to suboptimal deduplication since a first node may have already identified a redundant data segment but a second node is not yet aware of it because the dictionary is not shared between the two nodes. Thus, the second node stores the same data segment as an original segment. Sharing the entire dictionary would be possible with a locking mechanism and a mechanism for coalescing updates from multiple nodes. However, such mechanisms can be complicated and adversely impact performance.

Consequently, a work partitioning scheme can be applied based on hash value ranges for various data segments. Ranges of hash values are assigned to different nodes within the cluster. If a node is processing a data segment which has a hash value which maps to another node, it will contact the other node that owns the range to find out if the data segments already exist in a datastore.

FIG. 3 illustrates multiple dictionaries assigned to different hash ranges. Although hash ranges are described, it should be recognized that the dictionary index can be hash ranges, reference values, or other types of keys. According to various embodiments, the hash values are SHA™ hash values. In particular embodiments, dictionary 301 is used by a first node and includes hash ranges from 0x0000 0000 0000 0000- 0x0000 0000 FFFF FFFF. Dictionary 351 is used by a second node and includes hash ranges from 0x0000 0001 0000 0000- 0X0000 0001 FFFF FFFF. Values within the range for dictionary 301 are represented by symbols a, b, and c for simplicity. Values within the range for dictionary 351 are represented by symbols i, j, and k for simplicity. According to various embodiments, each hash value in dictionary 301 is mapped to a particular storage location 321 such as location 323, 325, or 327. Each hash value in dictionary 351 is mapped to a particular storage location 371 such as location 373, 375, and 377.

Having numerous small segments increases the likelihood that duplicates will be found. However, having numerous small segments decreases the efficiency of using the dictionary itself as well as the efficiency of using associated filemaps and datastore suitcases.

FIG. 4A illustrates one example of a non-container file. According to various embodiments, container files such as ZIP files, archives, productivity suite documents such as .docx, .xlsx, etc., include multiple objects of different types. Non-container files such as images and simple text files typically do not contain disparate objects.

According to various embodiments, it is recognized that certain types of non-container files do not benefit from having a segment size smaller than the size of the file itself. For example, many image files such as .jpg and .tiff files do not have many segments in common with other .jpg and .tiff files. Consequently, selecting small segments for such file types is inefficient. Consequently, the segment boundaries for an image file may be the boundaries for the file itself. For example, noncontainer data 401 includes file 403 of a type that does not benefit from finer grain segmentation. File types that do not benefit from finer grain segmentation include image files such as .jpg, .png, .gif, and .bmp files. Consequently, file 403 is provided with a single segment 405. A single segment is maintained in the deduplication dictionary. Providing a single large segment encompassing an entire file can also make compression of the segment more efficient. According to various embodiments, multiple segments encompassing multiple files of the same type are compressed at the same time. In particular embodiments, only segments having data from the same type of file are compressed using a single compression context. It is recognized that specialized compressors may be applied to particular segments associated with the same file type.

Figure 4B:
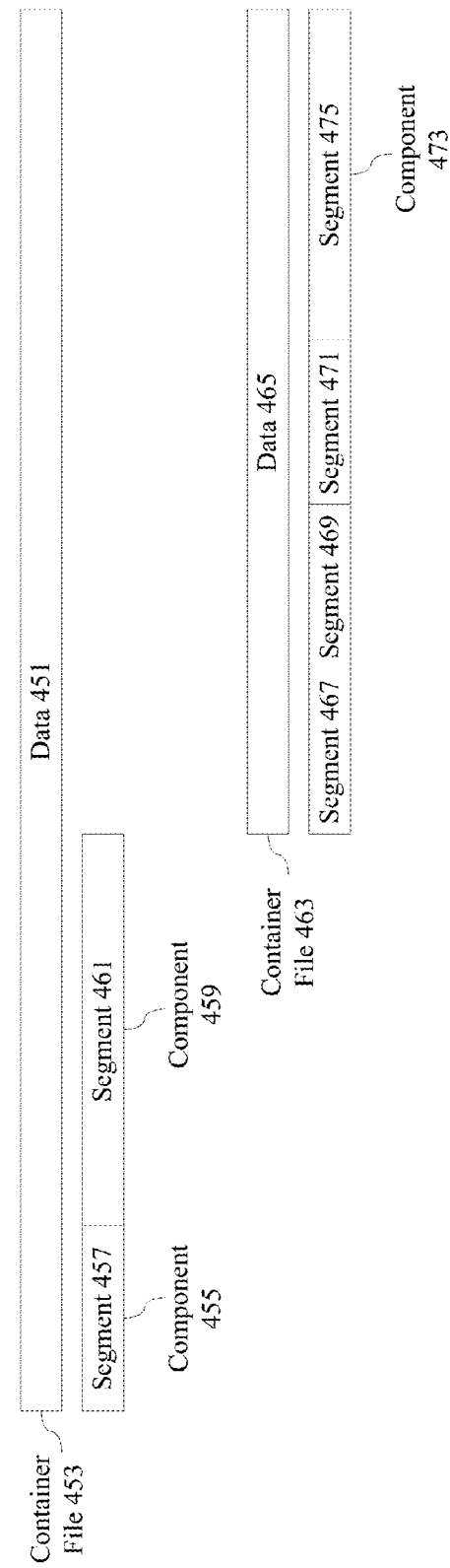
FIG. 4B illustrates a particular example of a file having multiple data segments and components.

FIG. 4B illustrates one example of a container file having multiple disparate objects. Data 451 includes a container file that does benefit from more intelligent segmentation. According to various embodiments, segmentation can be performed intelligently while allowing compression of multiple segments using a single compression context. Segmentation can be implemented in an intelligent manner for deduplication while improving compression efficiency. Instead of selecting a single segment size or using a sliding segment window, file 453 is delayered to extract file components. For example, a .docx file may include text, images, as well as other container files. For example, file 453 may include components 455, 459, and 463. Component 455 may be a component that does not benefit from finer grain segmentation and consequently includes only segment 457. Similarly, component 459 also includes a single segment 461. By contrast, component 463 is actually an embedded container file 463 that includes not only data that does benefit from additional segmentation but also includes another component 473. For example, data 465 may include text. According to various embodiments, the segment size for text may be a predetermined size or a dynamic or tunable size. In particular embodiments, text is separated into equal sized segments 467, 469, and 471. Consequently, data may also include a non-text object 473 that is provided with segment boundaries aligned with the object boundaries 475.

Figure 5:
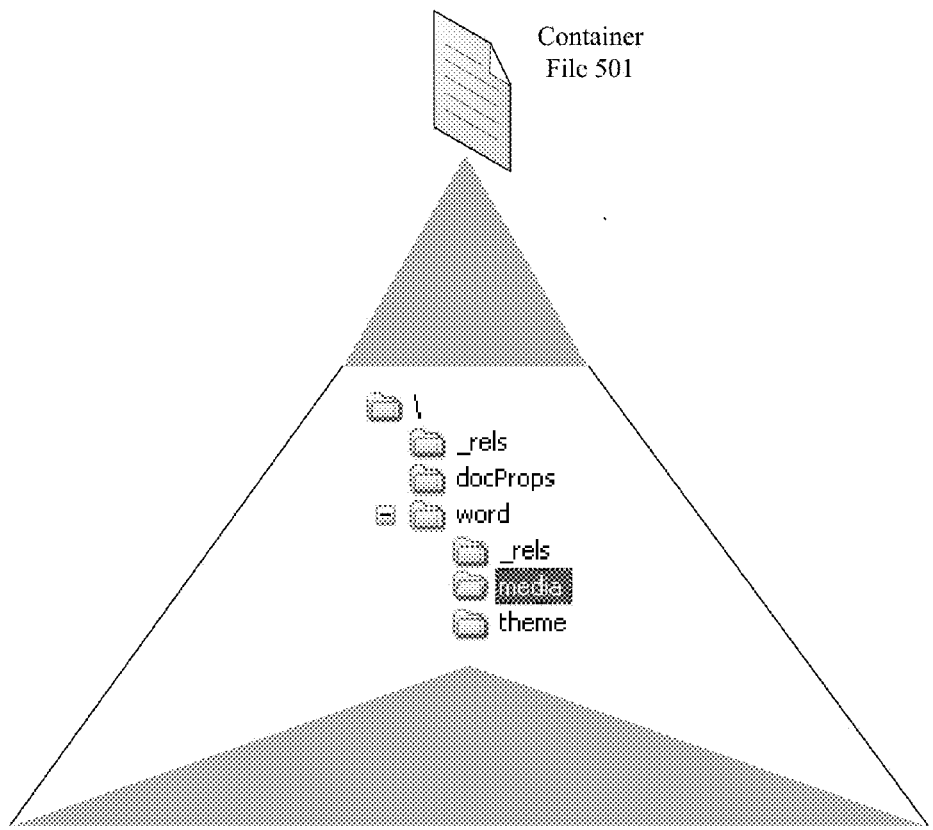
FIG. 5 illustrates a particular example of a container file.

FIG. 5 illustrates one example of a container file. According to various embodiments, container file 501 includes multiple disparate objects including .jpeg and .xml objects. The .xml objects can benefit from intelligent segmentation while the .jpeg objects are left without further segmentation.

Figure 6:
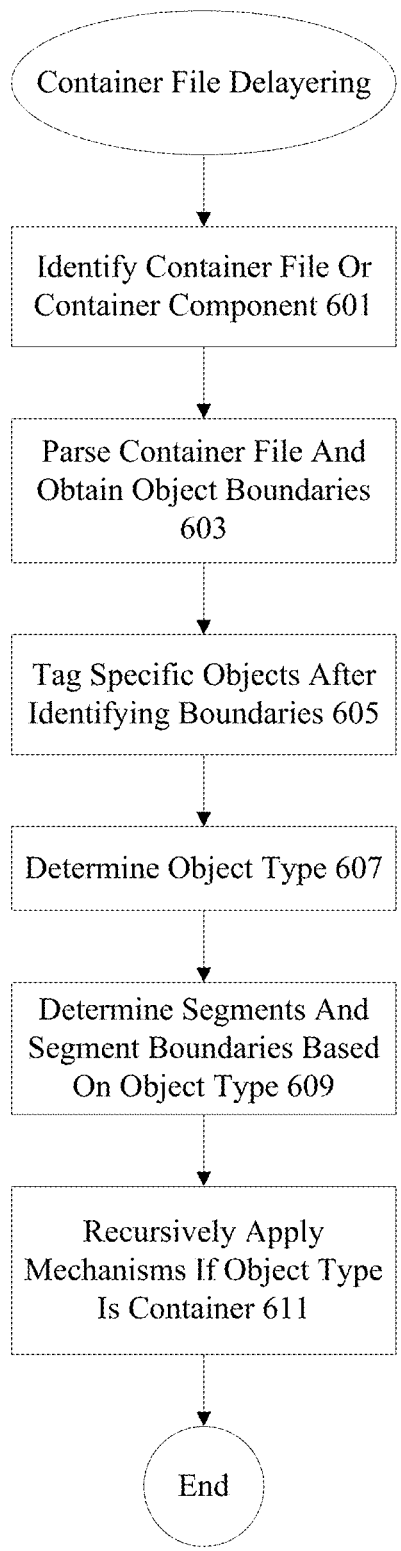
FIG. 6 illustrates a technique for delayering a container file.

FIG. 6 illustrates a mechanism for performing file delayering. According to various embodiments, the main mechanisms used for delayering are object extraction, object identification and object referencing. At 601, a container file or container component is identified. At 603, the container file is decoded and object boundaries are identified. In some example, the container file itself may have to be decompressed before identifying embedded components. When the specific boundaries are identified, the specific objects are uniquely tagged at 605. For example, a container document may include text, a spreadsheet and two images. Although this document is represented on disk as a single file, it is in actuality a container file which includes multiple documents in a specific directory hierarchy. Each file object may be individually compressed. At 607, object types are determined. At 609, segments are detected based on object or component type. For example, image type objects have segment boundaries equal to the boundaries of the image object. Text type objects may have predetermined segment sizes for that particular type of text. In some embodiments, different file types are preevaluated to determined optimal segment sizes for file types that do benefit from finer grain segmentation. At 611, mechanisms are repeated to recursively apply segment detection to objects within objects.

Once all objects in the container file have been finger printed, deduplication at the object level can readily take place and individual objects can be stored with the redundant data being stored only once.

Figure 7:
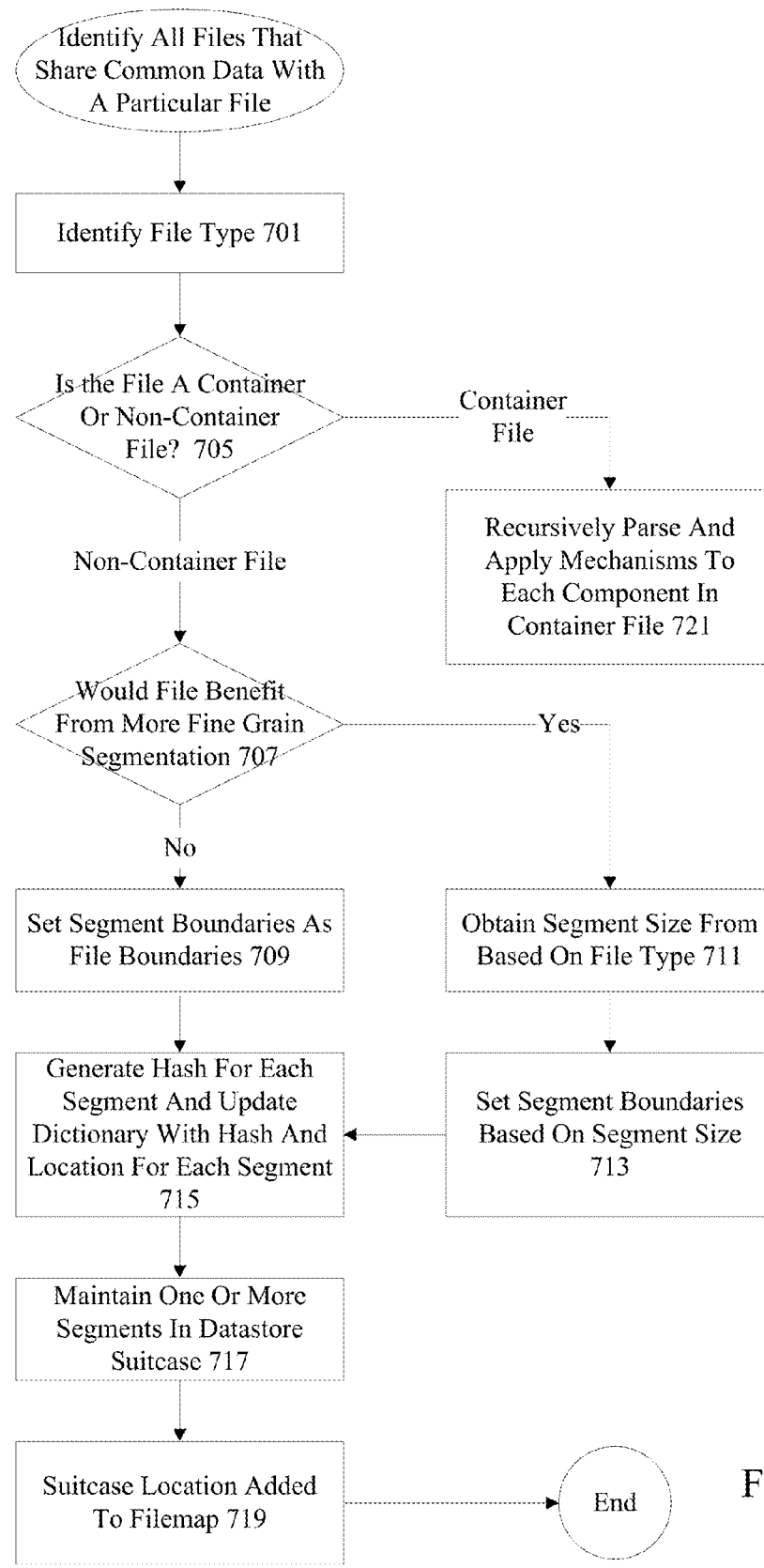
FIG. 7 illustrates a technique for detecting segment boundaries.

FIG. 7 illustrates a technique for detecting segment boundaries. At 701, file type is identified. In particular embodiments, file type may be identified by tags, extensions, embedded identifiers, etc. According to various embodiments, files may be container files or non-container files. Non-container files may or may not benefit from more fine grained segmentation. In particular embodiments, it is determined whether the file is a container file or a non-container file at 705. If the file is a non-container file, then it is determined whether the file would benefit from more fine grained segmentation at 707. If the file is of a type that does not benefit from additional segmentation, the segment boundaries are set as the file boundaries at 709. According to various embodiments, if the file is of a type that does benefit from additional segmentation, segment sizes are determined based on file type.

According to various embodiments, various file types such as .txt, .raw, etc., are analyzed to determine preferred segment sizes and the predetermined segment sizes. In particular embodiments, a segment size is determined at 711 based on file type. At 713, segment boundaries are set based on the obtained segment size. At 715, a hash is generated for each segment and a dictionary is updated. According to various embodiments, an entry may be added to a dictionary. In other embodiments, a reference count for a corresponding entry in the dictionary may be updated. At 717, the one or more segments are maintained in a datastore suitcase. At 719, the suitcase location is added to a filemap for the file using the segment boundaries. In situations where a file includes a single segment, the filemap may include only a single entry.

If the file is determined to be a container file at 705, the file is recursively parsed at 721 and segment detection mechanisms are applied to each individual component of the container file.

Figure 8:
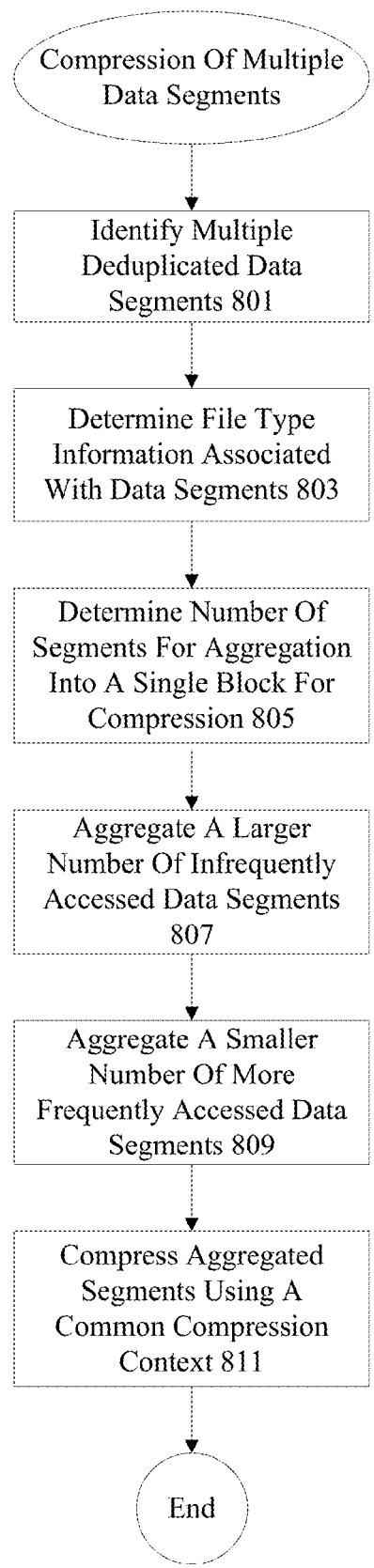
FIG. 8 illustrates a technique for performing compression across multiple segments.

FIG. 8 illustrates a technique for performing compression across multiple segments. According to various embodiments, multiple deduplicated data segments are identified for compression at 801. The deduplicated segments may be associated with a datastore suitcase maintained at a storage array. At 803, file types associated with the multiple deduplicated segments are identified. At 805, the number of segments for aggregation into a single block for compression using a common context is determined. In some examples, the number of segments aggregated is the highest number of segments associated with the same file type that does not exceed a maximum size. In other examples, the number of segments aggregated is based on the frequency of access for the segments. It may be determined that particular segments are relatively infrequently accessed. A larger number of these infrequently accessed segments may be aggregated for compression at 807. A smaller number of frequently accessed segments or even single frequently accessed segments may be compressed using a single context at 809. In some examples, very frequently access segments are not compressed at all.

According to various embodiments, aggregated segments are compressed using a single compression context at 811. In some examples, the compression algorithm applied may be file type specific. In particular embodiments, a compressor algorithm examines patterns across multiple segments that may span multiple files to determine frequently occurring patterns. In some examples, the most frequently occurring patterns are replaced using the shortest possible code words. In other examples, frequently occurring patterns across multiple segments are merely replaced by the same set of shorter code words.

According to various embodiments, it is recognized that various file types have optimal data segment boundaries equal to the file boundaries. Recognizing this allows the storage of only one entry in the dictionary for the entire file. Images are examples of file types where the optimal data segment size is the whole file. Individual images on a disk are easy to find. However, images and other objects where the ideal deduplication boundary is the whole file can be stored in container files as well. Container files can be ZIP files or even Microsoft Office documents such as Word or Power Point documents. Delayering is used to extract objects from container files. The objects are stored and deduplicated as individual objects.

Figure 9:
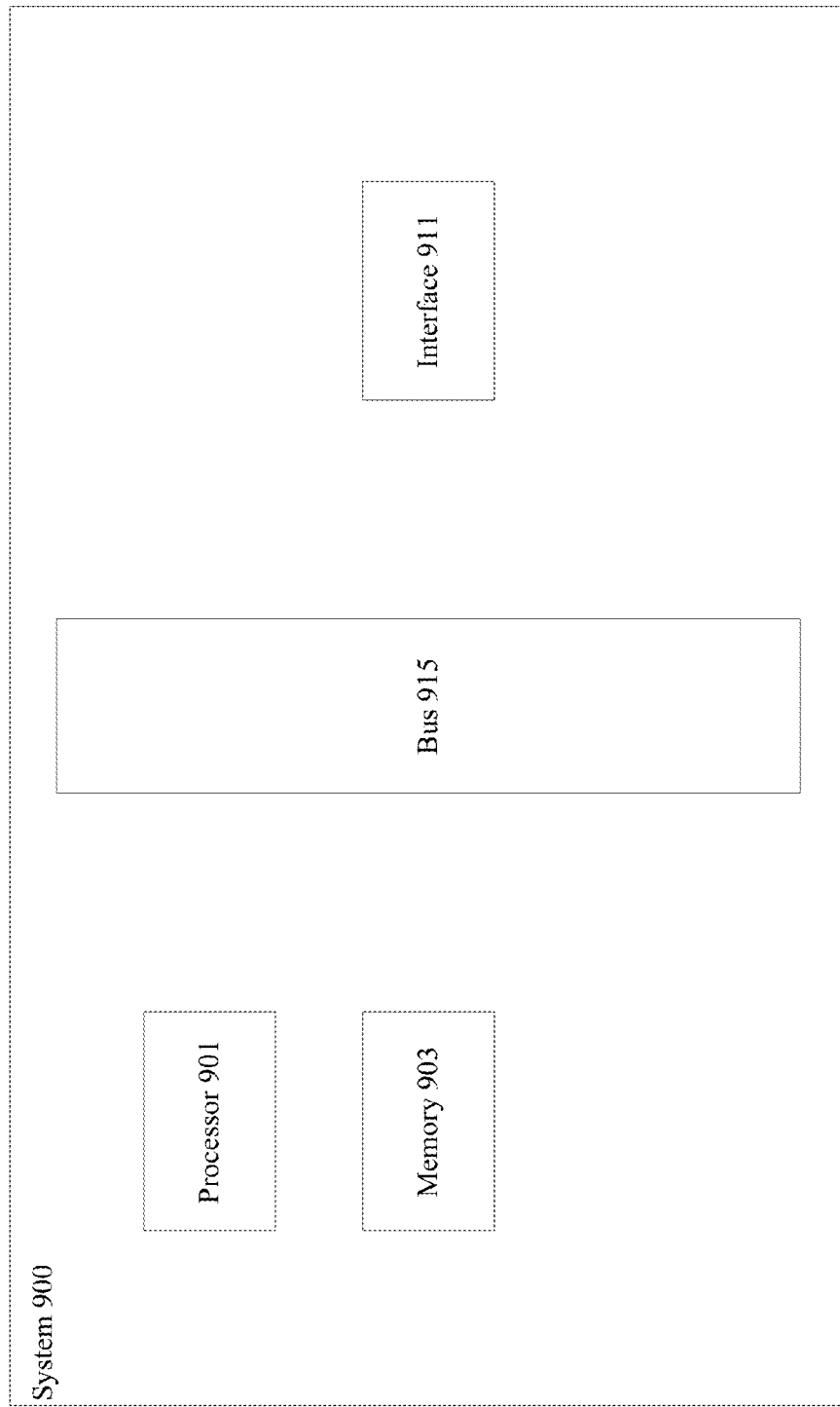
FIG. 9 illustrates a particular example of a computer system.

A variety of devices and applications can implement particular examples of commonality determination. FIG. 9 illustrates one example of a computer system. According to particular example embodiments, a system 900 suitable for implementing particular embodiments of the present invention includes a processor 901, a memory 903, an interface 911, and a bus 915 (e.g., a PCI bus). When acting under the control of appropriate software or firmware, the processor 901 is responsible for such tasks such as optimization. Various specially configured devices can also be used in place of a processor 901 or in addition to processor 901. The complete implementation can also be done in custom hardware. The interface 911 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 900 uses memory 903 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
receiving a plurality of data files;
partitioning the plurality of data files into a plurality of data segments for deduplication, wherein a segment size is determined using file type information associated with the plurality of data files;
identifying a plurality of deduplicated data segments configured for storage at a storage system;
compressing a plurality of deduplicated data segments using a common compression context, wherein the plurality of deduplicated data segments are compressed upon determining that the plurality of deduplicated data segments are infrequently accessed, wherein a compressor examines patterns across the plurality of infrequently accessed deduplicated data segments to determine frequently occurring patterns, wherein a single deduplicated data segment is compressed using a non-shared compression context upon determining that the single deduplicated data segment is accessed frequently.

2. The method of claim 1, wherein the plurality of data segments span a plurality of files.

3. The method of claim 1, wherein the plurality of files are determined to be container or non-container files based on the file types associated with the files.

4. The method of claim 3, wherein non-container files are evaluated to identify whether the non-container files would benefit from more fine-grained segmentation, wherein non-container files that would not benefit from more fine-grained segmentation have segment boundaries set to the file boundaries.

5. The method of claim 4, wherein container files are recursively parsed to determine whether components of the container files are container or non-container components.

6. The method of claim 4, wherein deduplicating the plurality of files comprises generating a plurality of filemaps corresponding to the plurality of files.

7. The method of claim 4, wherein deduplicating the plurality of files comprises generating a plurality of datastore suitcases.

8. The method of claim 7, wherein the datastore suitcase further comprises a plurality of reference counts corresponding to the plurality of deduplicated data segments.

9. The method of claim 8, wherein the plurality of deduplicated data segments are determined to be infrequently accessed if they have low associated reference counts.

10. A system, comprising:
an interface configured to receive a plurality of data files;
a processor configured to partition the plurality of data files into a plurality of data segments for deduplication, wherein a segment size is determined using file type information associated with the plurality of data files;
storage configured to maintain a plurality of deduplicated data segments;
wherein a plurality of deduplicated data segments are compressed using a common compression context, wherein the plurality of deduplicated data segments are compressed upon determining that the plurality of deduplicated data segments are infrequently accessed, wherein a compressor examines patterns across the plurality of infrequently accessed deduplicated data segments to determine frequently occurring patterns, wherein a single deduplicated data segment is compressed using a non-shared compression context upon determining that the single deduplicated data segment is accessed frequently.

11. The system of claim 10, wherein the plurality of data segments span a plurality of files.

12. The system of claim 10, wherein the plurality of files are determined to be container or non-container files based on the file types associated with the files.

13. The system of claim 12, wherein non-container files are evaluated to identify whether the non-container files would benefit from more fine-grained segmentation, wherein non-container files that would not benefit from more fine-grained segmentation have segment boundaries set to the file boundaries.

14. The system of claim 13, wherein container files are recursively parsed to determine whether components of the container files are container or non-container components.

15. The system of claim 13, wherein deduplicating the plurality of files comprises generating a plurality of filemaps corresponding to the plurality of files.

16. The system of claim 13, wherein deduplicating the plurality of files comprises generating a plurality of datastore suitcases.

17. The system of claim 16, wherein the datastore suitcase further comprises a plurality of reference counts corresponding to the plurality of deduplicated data segments.

18. The system of claim 17, wherein the plurality of deduplicated data segments are determined to be infrequently accessed if they have low associated reference counts.

* * * * *